(12) United States Patent
Coustier et al.

(10) Patent No.: US 6,426,165 B1
(45) Date of Patent: Jul. 30, 2002

(54) ELECTROCHEMICAL CELL SEPARATORS WITH HIGH CRYSTALLINITY BINDERS

(75) Inventors: Fabrice Coustier, Dublin; Gowri S. Nagarajan, Pleasanton, both of CA (US); Richard Mank, Chesire, CT (US); Richard Bradford, Livermore, CA (US)

(73) Assignee: PolyStor Corporation, Livermore, CA (US)

(*) Notice: Subject to any disclaimer, the term of this patent is extended or adjusted under 35 U.S.C. 154(b) by 0 days.

(21) Appl. No.: 09/745,819

(22) Filed: Dec. 20, 2000

(51) Int. Cl.$^7$ ................................................ H01M 6/18
(52) U.S. Cl. ...................................... 429/316; 29/623.4
(58) Field of Search ........................... 429/300, 303–306, 429/316; 29/623.4

(56) References Cited

U.S. PATENT DOCUMENTS

| | | |
|---|---|---|
| 4,238,571 A | 12/1980 | Mano et al. |
| 4,384,047 A | 5/1983 | Benzinger et al. |
| 5,456,000 A | 10/1995 | Gozdz et al. |
| 5,470,357 A | 11/1995 | Schmutz et al. |
| 5,631,103 A | 5/1997 | Eschbach et al. |
| 5,639,573 A | 6/1997 | Oliver et al. |
| 5,716,421 A | 2/1998 | Pendalwar et al. |
| 5,853,916 A | 12/1998 | Venugopal et al. |
| 6,024,773 A | 2/2000 | Inuzuka et al. |
| 6,225,010 B1 * | 5/2001 | Hamano et al. |
| 6,235,066 B1 * | 5/2001 | Inuzuka et al. |

FOREIGN PATENT DOCUMENTS

| | | |
|---|---|---|
| EP | 0 848 445 A1 | 6/1998 |
| EP | 0 851 522 A2 | 7/1998 |
| JP | 10-284111 | * 10/1998 |

OTHER PUBLICATIONS

Bottino, et al., "The formation of microporous polyvinylidene difluoride membranes by phase separation", Elsevier Science Publishers, Journal of Membrane Science, Received Aug. 11, 1989; accepted in revised form Jul. 30, 1990, pp. 1–19.

Hiatt, et al., "Microporous Membranes via Upper Critical Temperature Phase Separation", University of Florida, received Jul. 16, 1984, pp. 229–244.

* cited by examiner

*Primary Examiner*—Gabrielle Brouillette
*Assistant Examiner*—Susy Tsang-Foster
(74) *Attorney, Agent, or Firm*—Beyer Weaver & Thomas, LLP

(57) ABSTRACT

Provided are alternative fabrication methods and compositions for an electrochemical cell. The methods and compositions of the present invention are particularly, though not exclusively, applicable to the manufacture of polymer-cased lithium-ion secondary battery cells. Briefly, the present invention provides an electrochemical cell fabrication process wherein a PVDF-based binder specifically selected for its physical and chemical properties, in particular, its high crystallinity, is coated on a porous separator material to form a porous separator. The high crystallinity PVDF of the binder results in improved cell structure and performance.

24 Claims, 5 Drawing Sheets

ELECTROCHEMICAL CELL SEPARATORS WITH HIGH CRYSTALLINITY BINDERS

BACKGROUND OF THE INVENTION

The present invention relates to electrochemical energy storage devices (electrochemical cells). More particularly, the invention relates to a method of fabricating a polymer-cased battery cell having a porous separator.

Due to the increasing demand for battery-powered electronic equipment, there has been a corresponding increase in demand for rechargeable electrochemical cells having high specific energies. In order to meet this demand, various types of rechargeable cells have been developed, including improved aqueous nickel-cadmium batteries, various formulations of aqueous nickel-metal hydride batteries, nonaqueous rechargeable lithium-metal cells and nonaqueous rechargeable lithium-ion cells. While rechargeable lithium-metal cells have high energy densities and specific energies, they have historically suffered from poor cycle life, discharge rate, and safety characteristics, and so have not gained widespread acceptance.

Lithium-ion cells (sometimes referred to as "lithium rocking chair," or "lithium intercalation" cells) are attractive because they preserve much of the high cell-voltage and high specific-energy characteristics of lithium-metal cells. Because of their superior performance characteristics in a number of areas, they quickly gained acceptance in portable electronics applications following their introduction in the early 1990's. Lithium-ion cells retain their charge considerably longer than comparable nickel-cadmium (NiCad) cells and are significantly smaller, both of which are desirable characteristics since manufacturers seek to make electronic products smaller and portable.

Battery cells are primarily composed of a positive electrode, a negative electrode, and an ion-conducting separator interposed between the two electrodes. Conventional lithium-ion battery cells have typically used as a separator a porous polymer film, such as polyethylene, polypropylene, polytetrafuoroethylene, polystryrene, polyethyleneterphtalate, ethylenepropylene diene monomer (EPDM), nylon and combinations thereof, filled with an electrolyte solution. Also, conventional cells are enclosed in a rigid case, typically made of stainless steel, in order to apply pressure to the cell components to maintain good electrical connections between the components.

In order to reduce the size and weight of battery cells, more recently attempts have been made to develop lithium-ion battery cells which do not require the rigid case in order to maintain good electrical connections between the battery cell's components. Instead of rigid cell casings, these cells may be packaged in polymer pouches. Various adhesives and binders have been proposed in order to provide sufficient adhesive strength between the components of such polymer-cased cells. Such binders include, for example, polyurethane, polyethylene oxide, polyacrylonitrile, polymethylacrylate, polyacrylamide, polyvinylacetate, polyvinylpyrrolidone, polytetrafluoroethylene, glycol diacrylate, polyvinylidene fluoride (PVDF), and copolymers of the foregoing and combinations thereof.

It is well known that a porous separator enhances the performance of a lithium-ion battery cell by facilitating electrolyte and ion flow between the electrodes. Typical separators used in lithium-ion battery cells are porous polymers, such as polyethylene, polypropylene or mixtures thereof. Previously described methods for fabricating polymer-cased lithium-ion battery cells have involved applying a binder resin solution, such as PVDF, to a porous separator, for example composed of polyethylene, and then adhering and laminating the positive and negative electrodes to the binder-coated separator. Thereafter, the binder resin solvent was evaporated to form the battery cell electrode laminate. Subsequently, the laminate was impregnated with electrolyte solution in a pouch, which was then sealed to complete the cell.

It has previously been noted that PVDF is a particularly useful binder material for polymer-cased battery cells. In addition to providing good lamination between the solid electrochemical components of a battery cell (electrodes and separator), cured PVDF confers rigidity to the battery cell package. The introduction of PVDF as a binder has resulted in improved lithium-ion battery cells, however, there is little reported work on determining optimal selection and use of PVDF materials in electrochemical cells.

It is believed that some conventional cells use PVDF KYNAR 461 as a binder in order to facilitate the assembly of cells due to that PVDF's low melting temperature which required only a low lamination temperature. However, cell integrity has been found to be insufficient to withstand the high temperature requirements that many the original equipment manufactures (OEMs) require.

Other cells have been made using PVDF copolymers (such as PVDF-HFP) that have low crystallinity, low melting point, and relatively low molecular weight. It is believed that such materials are not the most appropriate ones for optimal structural integrity in a gel-polymer lithium-ion battery.

Thus, processes and materials for facilitating the fabrication and improving the performance of electrochemical cells, including lithium-ion battery cells, would be desirable.

SUMMARY OF THE INVENTION

To achieve the foregoing, the present invention provides alternative fabrication methods and compositions for an electrochemical cell. The methods and compositions of the present invention are particularly, though not exclusively, applicable to the manufacture of polymer-cased lithium-ion secondary battery cells. Briefly, the present invention provides an electrochemical cell fabrication process wherein a PVDF-based binder specifically selected for its physical and chemical properties, in particular, its high crystallinity, is coated on a porous separator material to form a porous separator. The high crystallinity PVDF of the binder results in improved cell structure and performance.

In one aspect, the invention provides a method of making an electrochemical cell separator. The method involves contacting a porous separator material with a solution of a binder material, including polyvinylidene fluoride (PVDF) homopolymer having a crystallinity greater than about 50%. The PVDF will also preferably have a molecular weight greater than about 300,000, and a melting point greater than 160° C.

In another aspect, the invention provides an electrochemical cell separator. The separator includes a porous separator material and a porous coating of a binder formed on the separator material, the binder including a PVDF homopolymer having a crystallinity greater than about 50%. The PVDF will also preferably have a molecular weight greater than about 300,000, and a melting point greater than 160° C.

In other aspects, the invention provides electrochemical cells and methods of their manufacture using separators fabricated in accordance with the present invention.

These and other features and advantages of the present invention are described below with reference to the drawings.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides alternative fabrication methods and compositions for an electrochemical cell. The methods and compositions of the present invention are particularly, though not exclusively, applicable to the manufacture of polymer-cased lithium-ion secondary battery cells. Briefly, the present invention provides an electrochemical cell fabrication process wherein a PVDF-based binder specifically selected for its physical and chemical properties, in particular, its high crystallinity, is coated on a porous separator material to form a porous separator. The high crystallinity PVDF of the binder results in improved cell structure and performance.

Figure 1:
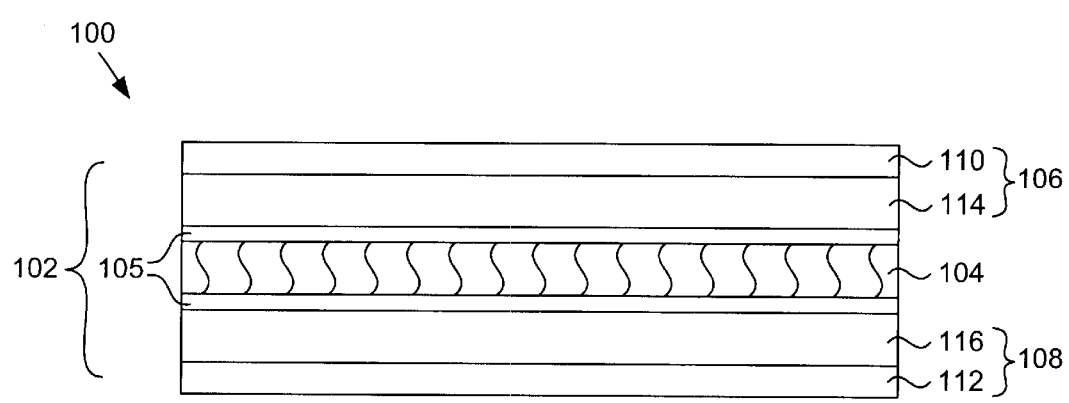
FIG. 1 depicts a portion of a single laminate layer of an electrochemical structure having a separator in accordance with one embodiment of the present invention.

Referring to FIG. 1, a portion 100 of a single laminate layer 102 of an electrochemical structure having a separator in accordance with one embodiment of the present invention is illustrated. As further described below, the electrochemical structure is typically in the form of jellyroll (wound laminate) or stack. The layer 102 includes a porous separator 104 interposed between a positive electrode 106 and a negative electrode 108. The separator is coated with a binder 105 to enhance the bonding of the structure's components to each other. The electrodes 106, 108 are typically formed on current collectors 110, 112, respectively, which may be composed of a highly conductive metal, such as copper or aluminum. For example, the positive electrode 106 may be composed of a cathode material 114 on an aluminum foil current collector 110, and the negative electrode 108 may be composed of an anode material 116 on a copper foil current collector 112.

In one embodiment of this aspect of the present invention, the components of the electrochemical structure may be composed of appropriate materials known to those of skill in the art. Suitable materials for a lithium-ion cell include, for example, for the positive electrode, carbon (as an electronic conductor), active material (e.g., lithium cobalt oxide, lithium manganese oxide, or lithium nickel oxide), and a binder, and for the negative electrode, carbon as an active material with a binder. In accordance with the present invention, the binder is PVDF specifically selected for its physical and chemical properties, in particular its high crystallinity. As noted above, the electrodes are typically formed on current collectors, which may be composed of a highly conductive metal, such as copper or aluminum The separator may be composed of a porous polyolefin, preferably polyethylene, polypropylene, or a combination of the two, coated as described below. Other possible separator materials include polytetrafluoroethylene, polystryrene, polyethyleneterphtalate, ethylenepropylene diene monomer (EPDM), nylon and combinations thereof The separator is typically filled with a liquid electrolyte composed of a solvent and a lithium salt. Sample liquid electrolyte compositions for lithium ion cells in accordance with the present invention may include solvents such as propylene carbonate, ethylene carbonate, diethyl carbonate, dimethyl carbonate, dipropyl carbonate, dimethyl sulfoxide, acetonitrile and combinations thereof, a lithium salt having $Li^+$ as the cation and one of $PF_6^-$, $AsF_6^-$, $BF_4^-$, $ClO_4^-$, $CF_3SO_3^-$, $N(CF_3SO_2)_2^-$ as the anion.

Figure 2A:
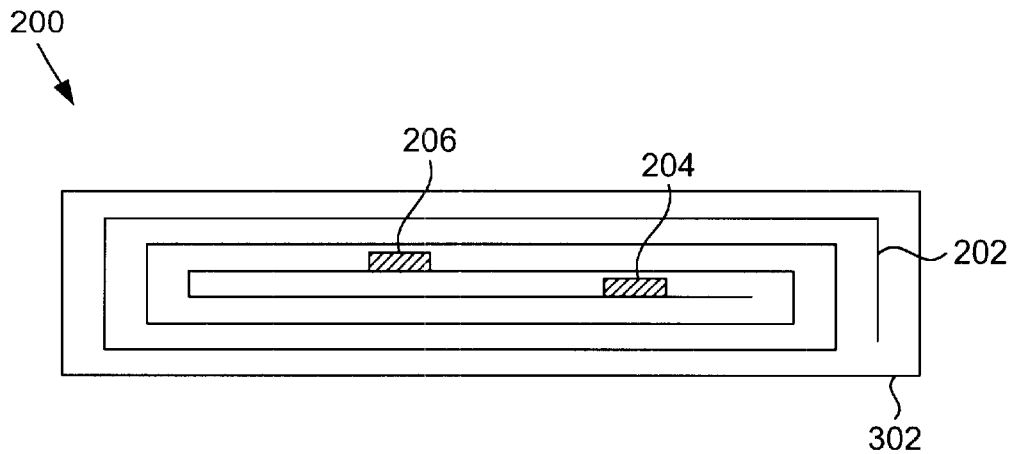
FIGS. 2A and 2B illustrate basic jellyroll and stacked electrochemical structures for cells in accordance with the present invention.
Figure 2B:
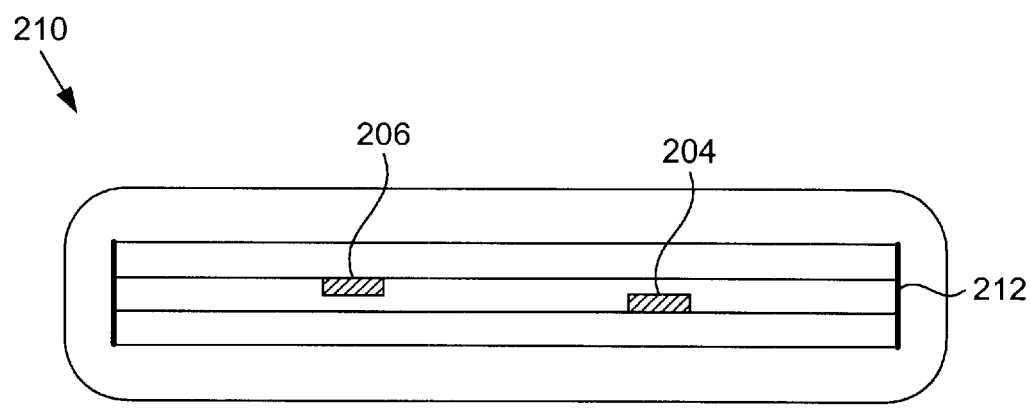

As noted above, an electrochemical structure for a cell in accordance with the present invention is typically in the form of a "jellyroll" (wound laminate) or stack. FIGS. 2A and 2B illustrate basic jellyroll and stacked electrochemical structures for cells in accordance with the present invention. FIG. 2A depicts an enlarged cross-sectional view of a cell (along the line A—A, FIG. 3) depicting a jellyroll structure 200 in accordance with one embodiment of the present invention. The jellyroll design 200 is formed by winding a laminate layer 202. FIG. 2B depicts an enlarged cross-sectional view of a cell (along the line A—A, FIG. 3) depicting a stacked structure 210 in accordance with one embodiment of the present invention. The stack 210 may be formed by stacking a series of laminate layers 212. In each case, a positive lead 204 is attached, e.g., by welding, to a portion of the positive electrode's current collector and a negative lead 206 is attached to a portion of the negative electrode's current collector. Winding, stacking, and associated fabrication techniques for cells described herein are well known to those skill in the art.

Figure 3:
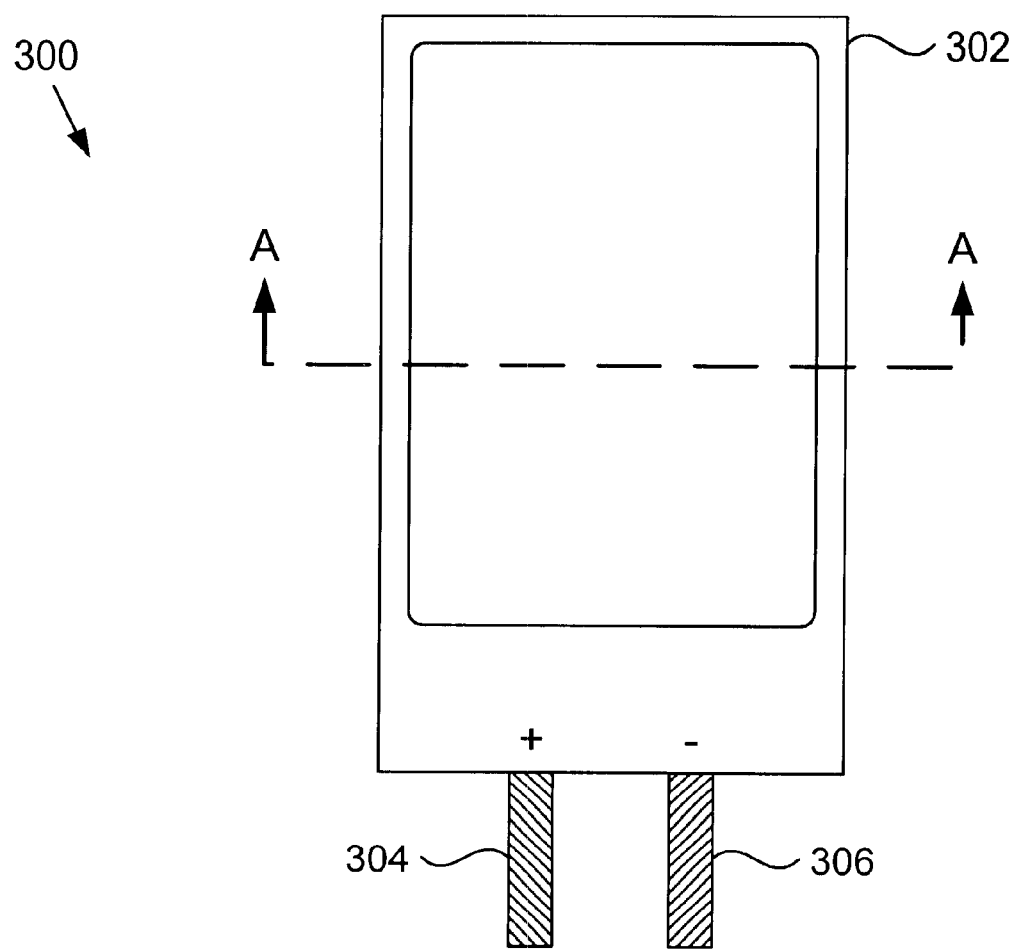
FIG. 3 depicts a completed battery cell in accordance with the present invention.

Referring to FIG. 3, in a completed battery cell in accordance with the present invention 300, an electrochemical structure having a porous binder-coated separator is packaged in a cell container 302. In one embodiment of the present invention, the cell container may be composed of a substantially gas-impermeable barrier material composed a polymer-laminated metal material that is lightweight and flexible. Such cell container materials are well known in the art for use in packaging gel-polymer as well as solid state polymer cell batteries. A particularly preferred cell container material is polymer-laminated aluminum foil, such as product number 96031, available from Pharma Center Shelbyville, Inc, of Shelbyville, Ky. Leads 304, 306 connected to each of the positive and negative electrodes of the cell as described above, extend from the sealed cell container 302 for external electrical connection.

Lamination of the electrodes and separator may be conducted according to any suitable method such as are known in the art, and may take place either before or after the cell is sealed in its container. Lamination and sealing techniques for cells such as those described herein are well known to those skill in the art. Lamination may use, for example, a first press at about 100 psi and 110° C. for about 2 minutes, followed by a second 100 psi press for about 2 minutes at room temperature in packaging with electrolyte.

The present invention is primarily directed to a process and compositions for providing a high-performance porous, binder-coated separator. As noted above, it has been found that the physical integrity for a battery cell as well as the battery's performance and safety may be enhanced by selecting a binder material having certain chemical-physical characteristics. In accordance with the present invention, the binder used to coat the separator material to form the coated separator used in an electrochemical cell is selected for particular properties found to provide good lamination and cell performance, In particular, the binder includes a PVDF homopolymer having physical characteristics consistent with optimal cell integrity and performance, in particular, high crystallinity (e.g., greater than 50%). Preferred PVDF binders also have a high molecular weight (e.g., greater than 300,000), and a high melting point (e.g., greater than 160° C.). Examples of such preferred PVDFs include KYNAR 301F and KYNAR 741, available from Elf Atochem, King of Prussia, Pa., and SOLEF 6020, available from SOLVAY, Brussels, Belgium.

The following table provides data on the properties of preferred PVDFs for separators and cells in accordance with the present invention (KYNAR 301F, KYNAR 741, SOLEF 6020), and those for a PVDF that does not fall within the parameters of compositions in accordance with the present invention (KYNAR 461):

| PROPERTIES | SOLEF 6020 Value | KYNAR 741 Value | KYNAR 301F Value | KYNAR 461 Value |
|---|---|---|---|---|
| Tensile Modulus (MPa) | 2500 | | 1450 | 1050–1400 |
| MFI (21.6 Kg, 230° C.) (G/10 min) | 1.2 | 7–15 | 2.4 | 6–14 |
| Tm (1$^{st}$ heating) (° C.) | 175.7 | 168 | 162.2 | 158 |
| T crystal (1$^{st}$ cooling) (° C.) | 135.2 | | 132.9 | |
| Tm (2d heating) (° C.) | 172.4 | | 162 | |
| Reverse addition (/100 VF2) | 4 | 2–3 | 5.5 | |
| Cryslallinity level (DSC) | 60% | 55–60% | 50.3% | 40% |
| Particle size (micron) | 100 | 4.4 | 4.4 | 4.4 |
| Intrinsic viscosity (DMF) L/g | 0.21 | | 0.145 | |
| GPC Mn | 101 000 | 136000 | 65 000 | |
| Mw | 300 000 | 323000 | 566 000 | 570 000 |

In some embodiments of the present invention, the PVDF binder may be dissolved in a solvent to form a solution having from about 1 to 15% binder in solvent, preferably about 1 to 4% binder in solvent, most preferably about 2% binder in solvent. In accordance with the present invention, binder solutions are formulated with any suitable solvent including, for example, acetone, tetrahydrofuran, methyl ethyl ketone, dimethyl formamide (DMF), dimethyl acetamide, tetramethyl urea, dimethyl sulfoxide, trimethyl phosphate, N-methyl pyrrolidone (NMP), butyrolactone, isophorone, and carbitol acetate. In preferred single solvent embodiments, the SOLEF 6020 may be dissolved in DMF and the KYNAR PVDFs may be dissolved in acetone.

In other embodiments of the present invention, the binder is dissolved in a solvent system of at least two solvents; from about 1 to 15% binder in solvent, preferably about 1 to 4% binder in solvent, most preferably about 2% binder in solvent. In accordance with the present invention, binder solutions are formulated with a low boiling/high solubility ("good") solvent and a higher boiling/no or low solubility ("bad") solvent to dissolve the binder and coat it on the separator. It is believed that, when the separator is subsequently dried by evaporation, the lower boiling solvent is removed first. The binder precipitates from solution. Thus, the coating of binder solution on the separator is composed of connected pockets of the bad solvent. The bad solvent is removed upon further drying leaving a porous coating of binder on the separator.

In accordance with the present invention, combinations of "good" and "bad" solvents may also include intermediate (i.e., moderate solubility for the binder material) or latent i.e., poor solubility for the binder material). Such solvents may provide other desirable characteristics, such as enhanced shelf life for the binder solution, etc. Alternatively, mixtures of three or more solvents, including more than one "good" solvent, can be used along with mixtures of one or more bad solvent to achieve such desirable characteristics.

For example, for a PVDF-based binder solution in accordance with one embodiment of the present invention, "good" solvents may include: acetone, tetrahydrofiran, methyl ethyl ketone, dimethyl formamide, dimethyl acetamide, tetramethyl urea, dimethyl sulfoxide, trimethyl phosphate, N-methyl pyrrolidone (NMP). "Bad" solvents include; pentane, methyl alcohol, hexane, carbon tetrachloride, benzene, trichloroethylene, isopropyl acetate, ethyl alcohol, toluene, tetrachloroethylene, xylene, o-chlorobenzene, decane; generally, aliphatic hydrocarbons, aromatic hydroons, chlorinated solvents, and alcohols. In addition to "goods" and "bad" solvents, other solvents may be characterized in the field as "intermediate" or "latent" solvents. "Intermediate" solvents include: butyrolactone, isophorone, and carbitol acetate. "Latent" solvents include: methyl isobutyl ketone, n-butyl acetate, cyclohexanone, diacetone alcohol, diisobutyl ketone, ethyl aceto acetate, triethyl phosphate, propylene carbonate, ethylene carbonate, dimethyl carbonate, diethyl carbonate, dimethyl phtalate, glycol ethers, glycol ether esters; carbonates generally. For the purposes of the present application, intermediate and latent solvents may act as "good" or "bad" solvents, respectively, depending on the particular combination of solvents used, or they may supplement a good/bad solvent combination. The same principles are applicable to binder materials other than PVDF, and given the disclosure herein one of skill in the art will be able to determine suitable solvent combinations with minimum experimentation.

Prior to application to a separator material, the binder is dissolved in a combination of solvents including at least one "good" solvent and at least one "bad" solvent, as noted above, to form a binder solution. In one embodiment, the solution may be prepared as follows: The PVDF powder along with the suitable combination of solvents is mixed under heat. A mixer, such as are available from Charles Ross and Son Company, Hauppage, New York (model No. PG40) may be used. After the boiling point of the solution is reached and/or when the solution becomes transparent rather than white-opaque, the solution is cooled down to room temperature and is ready for coating.

In a preferred embodiment, the ratio of solvents can be from about 99% good/1% bad (including intermediate and/or latent) to about 50% good/50% bad, preferably about 80% good/20% bad. In general, the solvents of the solvent system should be selected so that they produce a stable solution of the binder material. Given the guidance, including the specific examples, provided in this application, one of skill in the art would be able to select and combine appropriate solvents with minimal experimentation.

Some preferred solvents and their ratios of use in the binder solution include 90% acetone-10% ethanol; 90% acetone-10% methanol; 80% acetone-20% ethanol; and 80% acetone-20% methanol. One preferred binder solution in accordance with the present invention is 2% Kynar 301F in 90%Acetone-10%Ethanol.

For manufacturing reasons, an extended shelf life (e.g., at least about 2–12 hours, and preferably at least two to five days) is also recommended. In some instances, the shelf life of the binder solution may be extended by the addition of a third solvent, for example, NMP. Some examples of appropriate long shelf life three-solvent combinations are 89% acetone-1%NMP-10% ethanol and 88% acetone-2%NMP-10% ethanol.

Production of electrochemical separator in accordance with the present invention may be conducted using standard or custom industry equipment and methods adapted to the purpose. The binder may be applied to one side of the separator material at a time or, in another embodiment, both sides simultaneously.

For example, a roll of the separator material on a backing material, such as paper, plastic, or metal foil, may be coated on one side at a time with a binder solution in accordance with the present invention. The coated separator material is then dried by evaporation of the binder solution solvents to form a porous binder coating on one side of the separator material. After coating the first side, the roll is reversed and the same process is used again to coat the second side of the separator with binder solution. Suitable coating equipment is available from Hirano Tecseed Co. Ltd., Nara, Japan. In one embodiment, the equipment may be operated at about 10 meters per minute with a gap of about 60 to 70 microns and an oven temperature of about 30–60° C. (e.g., a temperature progression from about 30° C. to 50° C. to 60° C. in the three oven zones of this particular apparatus).

Alternatively, a roll of the separator material may be coated on both sides simultaneously, by running the separator material through a dipping bath of a binder solution in accordance with the present invention. The separator is impregnated with binder solution using this dip-coating method. The coated separator material is then dried by evaporation of the binder solution solvents to form a porous binder coating on both sides of the separator material. Suitable dip-coating equipment is available. In one embodiment, the equipment may be operated at about 10 meters per minute with an oven temperature of about 65° C.

The binder-coated separator may be carried through an air permeometer apparatus (e.g., Genuine Gurley™ 4320 (Automatic Digital Timer), available from Gurley Precision Instruments, Troy, N.Y., in order to determine if the coating had been successfully made porous. The output of a Gurley apparatus, referred to as a "Gurley number," is the number of seconds required for a known volume of air to go through a known area (e.g., 1 inch$^2$) of a membrane. In preferred embodiments of the present invention, the Gurley number for the binder-coated separator does not exceed three times the Gurley number of the uncoated separator material, in some cases about two times, and in some other cases no more than about 1.5 times the Gurley number of the uncoated separator material.

Cells in accordance with the present invention may be formed as described above using separators incorporating PVDF binders having the appropriate properties. Such cells have enhanced performance over conventional cells, as show, for example, in the following example.

EXAMPLE

The following example provides performance data for cells fabricated in accordance with the present invention. This material intended to assist in an understanding of the present invention and should not be construed to limit the scope of the invention.

Figure 4A:
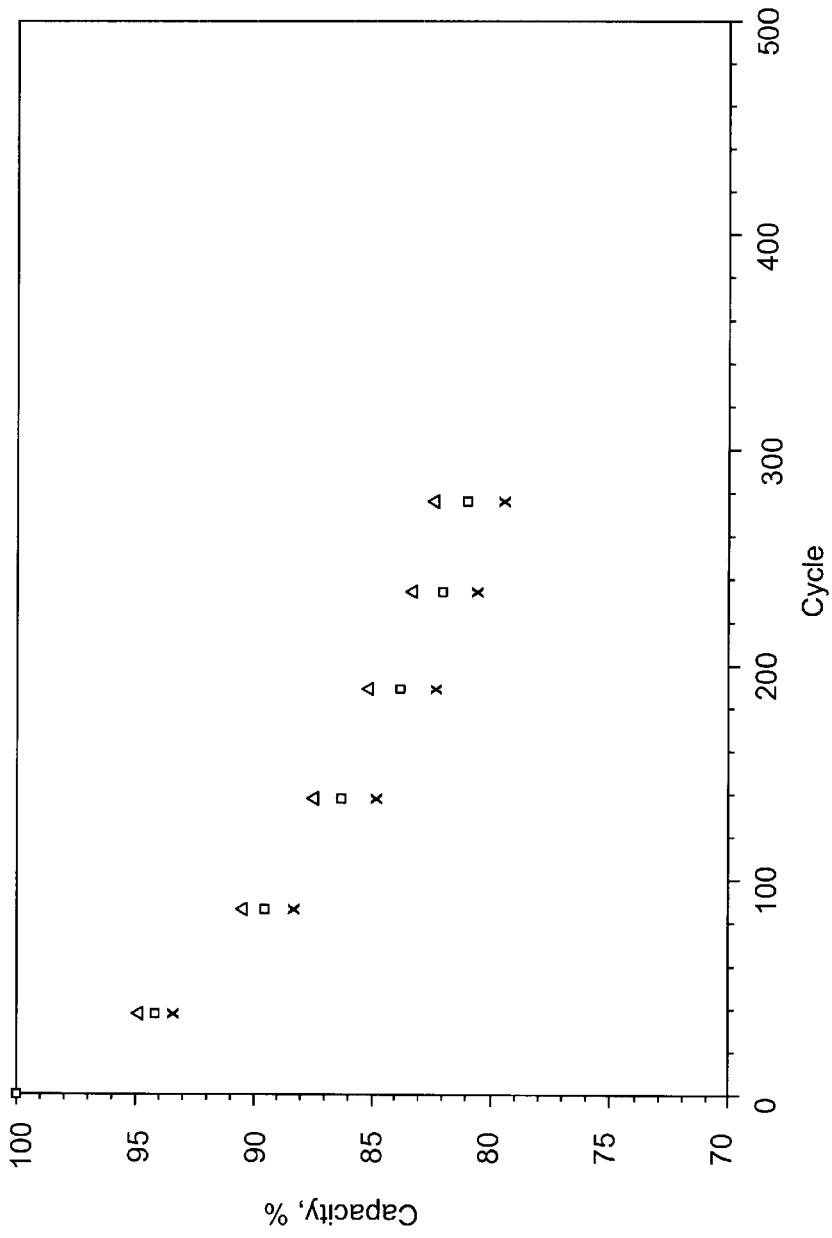
FIGS. 4A and 4B depict graphs of battery cell cycling data to illustrate the improved performance achieved using high crystallinity PVDFs in battery in accordance with the present invention.
Figure 4B:
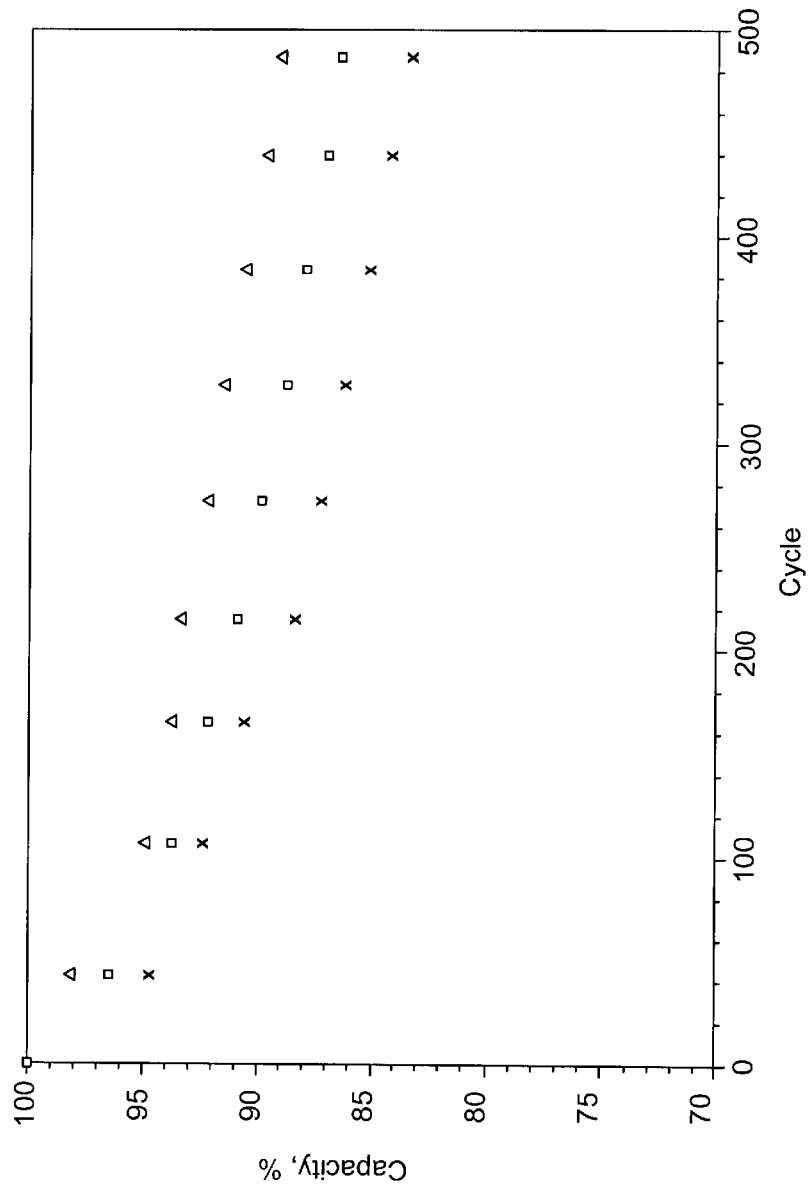

Cycling experiment were conducted using cells fabricated using PVDF KYNAR 301F (greater than 50% crystallinity) in accordance with the present invention, and with cells fabricated using the same techniques, but using PVDF KYNAR 461 (less than 50% crystallinity). FIGS. 4A and 4B show the results for these cells, respectively, where the squares represent the average capacity for 5 cells, and the other two symbols show the standard deviation.

The cells were 500 mAh cells and were cycled according to the following parameters: They were charged up to 4.2 V using C rate (in this case 500 mA) and discharged using C rate (500 mA) down to 2.8 V for 300 and 400 cycles respectively.

A common industry standard for an acceptable cell is one that retains at least 80% of its capacity through 400 cycles. As can be seen from the cycling vs. capacity graphs of FIGS. 4A and 4B, cycling of the KYNAR 461 cell was stopped at 300 cycles as the capacity dropped below 80%. Comparatively, the cells made with KYNAR 301F retained an average capacity of about 85% through 500 cycles.

Thus, it is clear that the cells made with the high crystallinity PVDF exhibit superior performance relative to the cells formed using lower crystallinity PVDF.

The process and compositions of the present invention using high crystallinity PVDFs have the advantage that they may be used to produce superior performing electrochemical cells.

Although the foregoing invention has been described in some detail for purposes of clarity of understanding, it will be apparent that certain changes and modifications may be practiced within the scope of the appended claims. It should be noted that there are many alternative ways of implementing both the process and compositions of the present invention. Accordingly, the present embodiments are to be considered as illustrative and not restrictive, and the invention is not to be limited to the details given herein, but may be modified within the scope and equivalents of the appended claims.

What is claimed is:

1. A method of coating an electrochemical cell electrode separator, comprising:
    contacting a porous separator material with a solution of a binder material, said binder solution comprising a polyvinylidene fluoride (PVDF) homopolymer having a crystallinity greater than about 50% by weight of the PVDF homopolymer.

2. The method of claim 1, wherein said PVDF has an average molecular weight greater than about 300,000.

3. The method of claim 1, wherein said PVDF has a melting point greater than 160° C.

4. The method of claim 2, wherein said PVDF has a melting point greater than 160° C.

5. The method of claim 1, wherein said binder solution further comprises at least two solvents, wherein a first of said at least two solvents has higher solubility for the PVDF binder material and a lower boiling point than a second of said at least two solvents and wherein the solution of binder material does not gel at a temperature below 30° C. in less than 4 hours, and further comprising evaporating said at least two solvents such that a porous coating of binder is formed on the separator material forming a coated separator.

6. The method of claim 1, wherein said binder solution comprises 2% by weight of the PVDF in 90% by weight acetone-10% by weight ethanol.

7. The method of claim 1, wherein said binder solution comprises 2% by weight of the PVDF in 88% by weight acetone-2% by weight NMP-10% by weight ethanol.

8. The method of claim 5, wherein said coated separator has a porosity such that the time for a known volume of air to pass through an area of coated separator is no more than three times the time for the known volume of air to pass through the same area of the uncoated porous separator material under the same conditions.

9. A method of making an electrochemical cell, comprising:
   contacting a porous separator material with a solution of a binder material, said binder solution comprising a polyvinylidene fluoride (PVDF) homopolymer having a crystallinity greater than about 50% by weight of the PVDF homopolymer;
   evaporating solvent from said binder material solution such that a porous coating of binder is formed on the separator material; and
   forming an electrochemical structure having,
      a positive electrode,
      a negative electrode, and
      the porous binder-coated separator separating the two electrodes;
   packaging said electrochemical structure in a polymer casing;
   applying electrolyte to said structure in said polymer casing;
   laminating said packaged structure under heat and pressure; and
   sealing said polymer-cased package structure.

10. The method of claim 9, wherein said PVDF has an average molecular weight greater than about 300,000.

11. The method of claim 9, wherein said PVDF has a melting point greater than 160° C.

12. The method of claim 10, wherein said PVDF has a melting point greater than 160° C.

13. The method of claim 9, wherein said binder solution further comprises at least two solvents, wherein a first of said at least two solvents has higher solubility for the PVDF binder material and a lower boiling point than a second of said at least two solvents and wherein the solution of binder material does not gel at a temperature below 30° C. in less than 4 hours, and further comprising evaporating said at least two solvents such that a porous coating of binder is formed on the separator material forming a coated separator.

14. The method of claim 9, wherein said binder solution comprises 2% by weight of the PVDF in 90% by weight acetone-10% by weight ethanol.

15. The method of claim 9, wherein said binder solution comprises 2% by weight of the PVDF in 88% by weight acetone-2% by weight NMP-10% by weight ethanol.

16. The method of claim 13, wherein said coated separator has a porosity such that the time for a known volume of air to pass through an area of coated separator is no more than three times the time for the known volume of air to pass through the same area of the uncoated porous separator material under the same conditions.

17. An electrochemical cell electrode separator, comprising:
   a porous separator material; and
   a porous coating of a binder formed on the separator material, said binder comprising a PVDF homopolymer having a crystallinity greater than about 50% by weight of the PVDF homopolymer.

18. The separator of claim 17, wherein said PVDF has an average molecular weight greater than about 300,000.

19. The separator of claim 17, wherein said PVDF has a melting point greater than 160° C.

20. The separator of claim 18, wherein said PVDF has a melting point greater than 160° C.

21. An electrochemical cell, comprising:
   an electrochemical structure, comprising,
      a positive electrode,
      a negative electrode, and
      a porous binder-coated separator separating the two electrodes, said separator comprising,
         a porous separator material, and
         a porous coating of a PVDF homopolymer binder formed on the separator material, said binder comprising a PVDF homopolymer having a crystallinity greater than about 50% by weight of the PVDF homopolymer;
   an electrolyte; and
   a polymer casing.

22. The electrochemical cell of claim 21, wherein said PVDF has an average molecular weight greater tan about 300,000.

23. The electrochemical cell of claim 21, wherein said PVDF has a melting point greater than 160° C.

24. The electrochemical cell of claim 22, wherein said PVDF has a melting point greater than 160° C.

* * * * *